Figure 4:
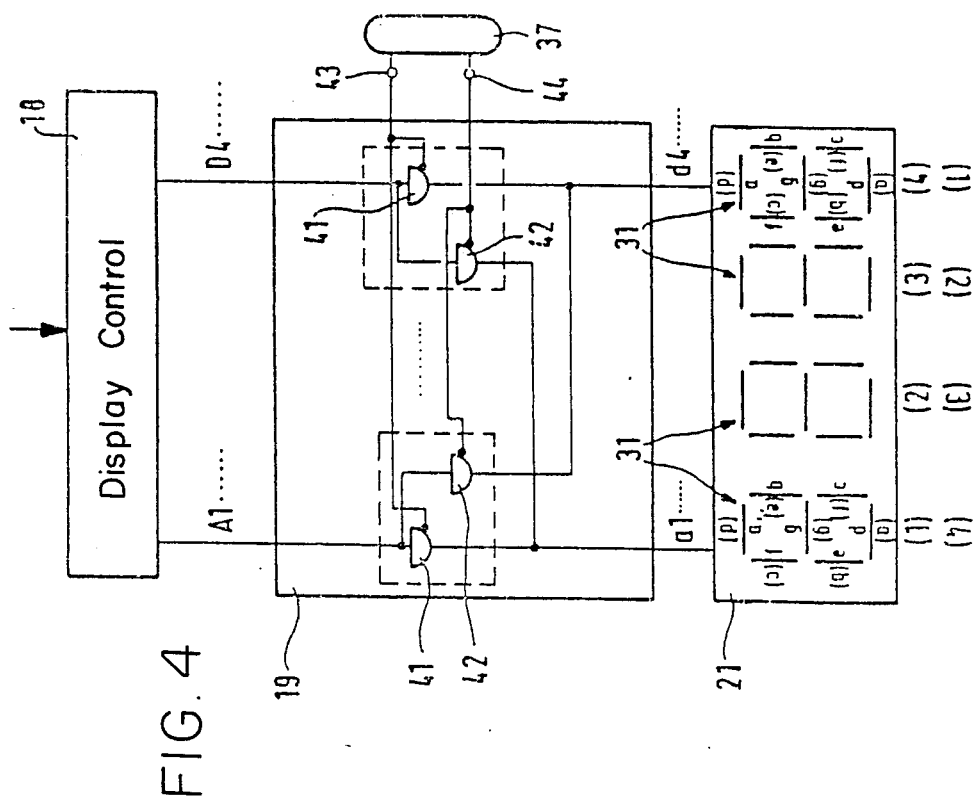

United States Patent [19]

Dübgen

[11] Patent Number: 4,851,685
[45] Date of Patent: Jul. 25, 1989

[54] DEVICE FOR MEASURING UV-RADIATION

[75] Inventor: Oswald Dübgen, Stuttgart, Fed. Rep. of Germany

[73] Assignee: Kosmedico Vertrieb Kosmetischer und Medizinischer Lampen GmbH, Stuttgart, Fed. Rep. of Germany

[21] Appl. No.: 105,871

[22] Filed: Jul. 1, 1987

[51] Int. Cl.⁴ .............................................. G01J 1/42
[52] U.S. Cl. .................................................. 250/372
[58] Field of Search ........................ 250/372; 364/559

[56] References Cited

U.S. PATENT DOCUMENTS 4,272,821 6/1981 Bradus ............................ 364/562 X

FOREIGN PATENT DOCUMENTS 0168116 12/1981 Japan .

Primary Examiner—Eugene R. LaRoche
Assistant Examiner—David Mis
Attorney, Agent, or Firm—Jones, Tullar & Cooper

[57] ABSTRACT

A hand held device for measurement of radiation includes a sensor unit and a digital processing unit between the sensor unit and a digital display unit. The sensor unit together with a signal processing unit and the digital display unit are accommodated in a common housing, and a position-dependent switch together with a switchable coding circuit are provided, by means of which the digital display unit may be switched so that it can be read in a position reversed by 180° in a plane thereof.

5 Claims, 2 Drawing Sheets

DEVICE FOR MEASURING UV-RADIATION

The present invention relates to a device, particularly a hand-carried device, for measuring radiation, particularly UV-radiation with a sensor unit, and with a signal processing unit between the sensor unit and a digital display unit.

In known radiation devices of this kind, for example measurement for UV-radiation, particularly for UVA radiation of solarium arrangements, a sensor unit is accomodated in a separate housing part, and is connected through a cable with a measurement unit proper, which contains the display and processing portion. During measurement, consequently the measuring housing provided with the display unit is held in one hand, while the sensor unit containing the measurement head is guided according to the direction from which the UVA radiation emanates, namely in the case of ceiling devices upwardly, or in the case of berths downwardly. A device of this type is relatively clumsy in handling, as both partsof the device or both housings must be held in one hand, and since during reading of the display device no control exists, how the other portion of the device is oriented in relation to the radiation to be measured. Furthermore, a cable conneciton is, in general, a part subject to malfunction.

It is an object of the present invention to devise an apparatus for the measurement of radiation of the afore described kind, in which only a single measurement device portion needs to be handled, and wherein, as hitherto, the display unit can be read in each measurement position in a simple manner.

To attain this object, there are provided in the device of the indicated type a common housing accomodating the sensor unit together with the signal processing unit and the digital display unit, and wherein a position-dependent switch together with a switchable coding circuit are provided, by means of which the digital display unit may be switched so that it can be read in a position reversed by 180° in a plane thereof.

The person who operates the inventive device advantageously has one hand free, as the one device need only be guided with one hand. Nevertheless, the display device is normally readable in each position thereof, namely both in the case where the device is held pointing vertically upwards for measurement of radiation emanating from a ceiling device or the like, as well as in the case where the device is held vertically pointing downwardly, so as to measure radiation emanating from a berth. This also applies for the measurement of upright-positioned tanning devices. This is the case, as the position-dependent switch makes it possible that in the case of so-called "placing-on-the-head" of the device, the display unit is so reconfigured in control, that starting from the original position, it also places the writing on the head, and writes from right to left, so that in this "on-head" position of the device, the display unit can again be read normally.

In a particularly advantgeous manner, in a parallelepiped shape of the hand-held housing, the sensor unit is disposed on a front side having a small surface, while the digital display unit is disposed on a longitudinal side at right angles to the front side, and has a large surface.

In a preferred embodiment of the present invention there is provided a 7-segment display in the digital display unit; this means that the inputs of the switchable coding circuit implemented as a logic matrix circuit, and which are connected with the control circuit, are connected via a respective logic building block with two display segments point-symmetrically disposed with respect to one another in the preferably multiple 7-segment modular building blocks of the display unit, and wherein the logical building blocks are controlled in groups from the position-dependent switch. This is an arrangement obtained at relatively little expense so as to attain the inventive object.

In a particularly advantageous manner a modular block is used in the control arrangement, which makes it possible, in conjunction with a key, to store a respective instantaneous display up to the next measurement.

Figure 1:
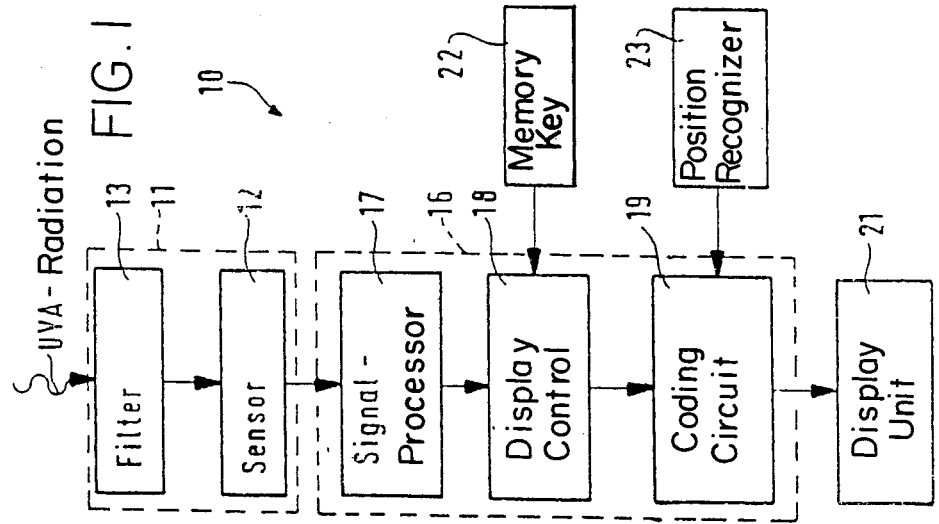
Figures 2, 3:
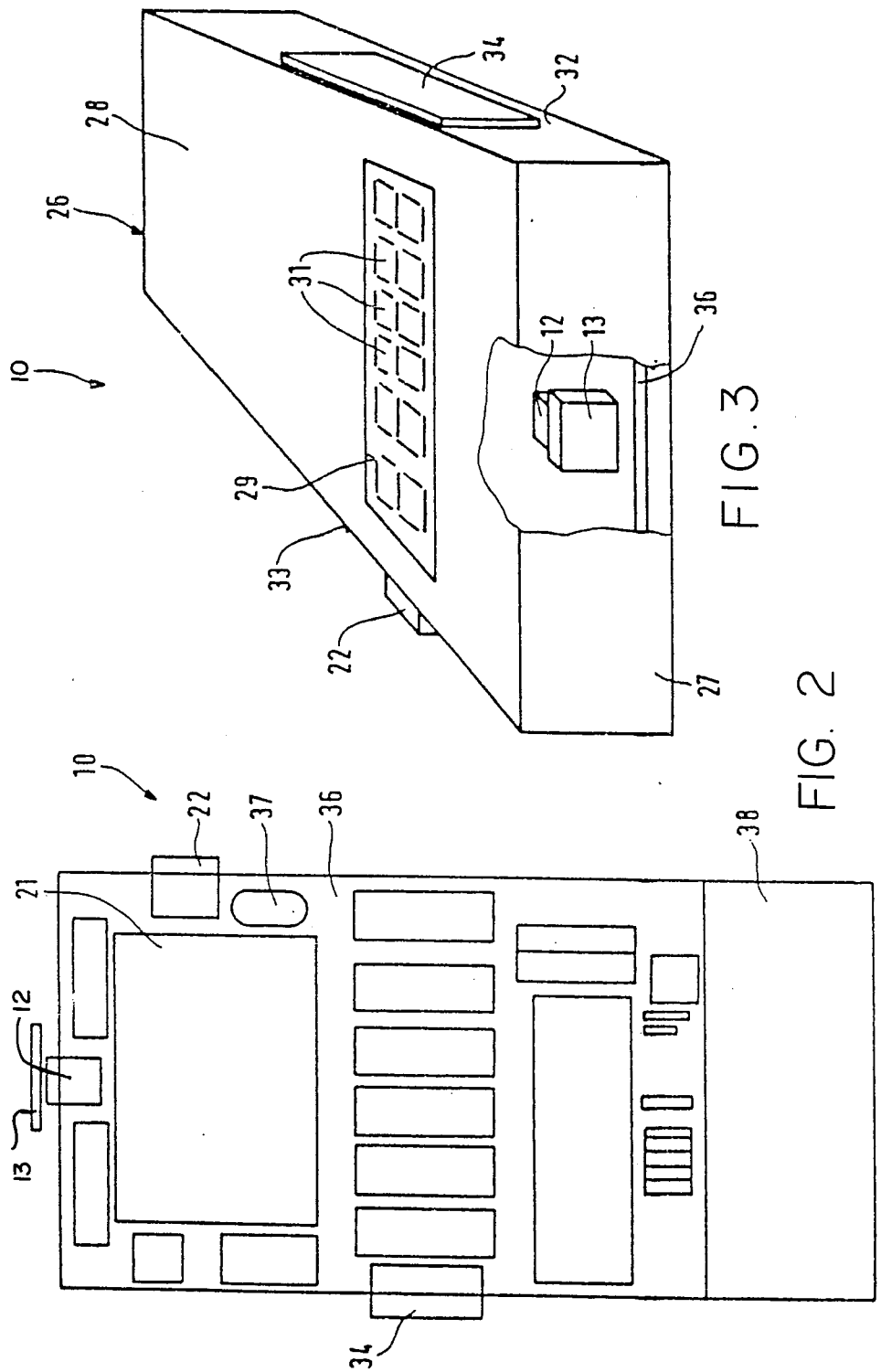

Further details and embodiments of the invention can be ascertained from the description which follows, in which the invention is described in further detail, and explained with the aid of embodiment examples shown in the drawing, wherein:

FIG. 1 is a block circuit diagram illustrating the measurement circuits of a hand-held device for measurement of UVA-radiation according to a preferred embodiment of the present invention, FIG. 2 is a schematic top plan view of the arrangement of the individual modular elements of a hand-held device for measuring of UVA radiation, FIG. 3 is a perspective and partially sectioned view of a hand-held device for measuring of UVA radiation according to FIG. 2, and FIG. 4 is a schematic diagram of a circuit for controlling the display device.

The inventive measurement-device 10 is formed, according to the illustrative embodiment, as a hand-held device, and serves for the measurement of UVA radiation within a DIN region of 350–400 mm.

The measurement unit 10 includes a sensor unit 11, which is exposed to the UVA radiation to be measured, or receives the same. The sensor unit 11 consists of a sensor 12, for example in the form of a photocell sensitive in the UV or UVA region, and a filter 13 precoupled thereto for filtering and passing the aforesaid UVA radiation therethrough. The sensor unit 11 is connected with a signal processing part 16, which in turn is coupled to a digital display device 21. The signal processing part 16 includes a signal transducer 17, which transforms the measurement signal arriving from sensor 11 for further processing, a display control unit 18 which is connected with a storage key 22, and a switchable coding circuit 19, which is controlled from a position-recognition part 23. The display unit 21 may be formed by segment-modular units or matrix-modular units which can be present in arbitrary multiples. In the embodiment example shown, the digital display unit 21 consists of a plurality of 7-segment display modular units. In FIGS. 2 and 3 the hand-held unit 10 is shown in top plan view and perspective view, respectively, in a schematic manner, so as to show where the modular units essential for the invention are located. The hand-held measurement unit has a housing 26 of about parallelepiped shape, on a smaller front side 27 of which there is disposed a sensor unit 11 in the form of a sensor 12 with a filter 13 precoupled and secured thereto. In an upper side 28 of the housing, which has a large surface and extends at right angles to the front side 27, there is formed a recess 29, within or behind which there is disposed a plurality of adjoining 7-segment modular units 31 of the display unit 21. On each of the elongated sides 32, 33 of the housing 26 there is disposed a main switch 34 for the measurement unit 10 or for the storage key 22, which projects through a passage of the housing.

Below the display unit 21 there is disposed a conductor plate 36, which extends over a substantial part of the base surface of the housing 26, and which contains the wiring of the individual electrical modular elements, of which only a few have been named *supra*, or are further discussed *infra*. On the contacting plate 36 there is also disposed a position-dependent switch 37 of the position recognition part 23. The position-dependent switch 37 is, for example, a mercury switch and serves, so to speak, to recognize two different positions of the measurement device 10, namely whether the measurement unit 10 or the housing unit 26 is situated in an inclined or vertically extending position with the sensor unit 11 pointing upwardly, or in an inclined or vertically extending direction with the sensor unit pointing downwardly. In the rear part of the housing 26 there is further situated a battery compartment for batteries, serving as an energy source for the measurement device 10.

If the inventive sensor device 10 is held in a position for measuring UVA radiation in such a vertically oriented position so that the sensor unit 11 points upwardly so as to, for example, measure the UVA radiation of a solarium deck device, or of the upper portion of a combined solarium device, then the operator holds the measurement unit 10 so that the upper side 28 of the housing 28, together with the display unit 21, are visible. The seven-segment modular unit 31 of the display unit 21 thereof provides a display legible in a usual manner, which is written from left to right. This applies also when the UVA radiation of a vertically disposed solarium device is to be measured, during which measurement the measurement device 10 is held horizontally, and wherein the sensor unit 11 faces away from the operator. The operator can then read, as has already been described, the display unit 21 or its 7-segment modular units 31 in the usual manner.

If, however the UV radiation of an individual solarium or the berth of a combined solarium device is to be measured, then the measurement device 10, together with the sensor unit 11, must be held pointing upwardly in a vertical direction, and wherein the upper side of the housing 28, together with the display unit 21 is directed towards the operator. In this vertical position of the measurement device 10, which is, so to speak, placed on its head, as a result of the other position of the position-dependent switch 37, the coding circuit 19 is switched over, so that the latter causes the display unit 21, or the 7-segment modular unit 31 to be read, not placed on its head, but in a normal position. In other words, even in that position of the measurement unit 10, the numerals are in a normal position, and the display is indicated from left to right.

FIG. 4 shows a circuit of the switchable coding arrangement 19 as it is disposed between the display control unit 18 and the digital display unit 21. It has to be emphasized that for the sake of simplicity the display unit 21 is only shown with four 7-segment modular units 31, while in FIG. 3 there are shown, for example, six of such modular units 31. The switchable coding circuit 19, which is built in the form of a matrix-circuit, includes inputs A1. .G1 to A4. .G4, which, in turn, are associated with each of the segments of the four 7-segment modular units 31, and which are connected with the display control unit 18, which also indicates the values of the modular units 1-4 for the display. For the sake of clarity there have been illustrated only, for example, the inputs A1 and D4 of the segment "a" of the first modular unit 31, or of the segment "d" of the fourth modular unit 31. This applies correspondingly also for the outputs a1 . . . g1 to a4 . . . g4, which are connected with the individual segments a . . . g of each of the four modular units 31.

Connection of the inputs with the outputs of the matrix circuit 19 is implemented as follows: each input A1, D4 (the corresponding also applies for others) is connected through its own logic gate or a tri-state driver 41 with its associated output a1 or d4. Furthermore, each input A1, D4 is connected through its own second logic gate, for example a tri-state driver 42, with that output which is connected with that segment of a modular unit 31, which is point-symmetrical with the above-named input associated with a segment within the display unit 21. This applies, according to FIG. 4, for the segment "a" of the first modular unit 31, and the segment "d" of the fourth modular unit 31, which can also be ascertained from the switching circuit. As in this number of the 7-segment modular unit the first modular unit 1 and the fourth modular unit 4 are point-symmetrical with respect to one another, it also applies within these modular units that the segments "b" and "e" and the segments "c" and "f" are point-symmetrical to one another, as are the segments "g". Correspondingly, this also applies for the second and third modular units 2 or 3. Consequently the input A1 is connected by a first gate 41 with the output a1, and via a first gate 42 with the output d4. This applies correspondingly for input D4 which is connected through a (25th) gate 41 with the output d4, and through a (25th) gate 42 with the output 41. As can be easily imagined, all further inputs and outputs are provided with corresponding gate arrangements, or are connected to one another. All gates 41 are connected to one another by means of their additional inputs and passed to a clamp 43, while all gates 42 are also connected with their additional inputs to one another, and are passed to a clamp 44. Both clamps 43 and 44 are connected with the position-dependent switch 37 of the position-recognition part 23.

If the measurement device is therefore in that inclined or vertical position, in which the sensor unit 11 points upwardly, then the position-dependent switch 37 is in a position in which an impulse is brought to the clamp 43, and consequently onto the AND gate 41, so that in the presence of an impulse on the inputs (A1, D4) the gates 41 are in a pass-through state, so that there occurs also on the outputs (a1, d4) an impulse for the appropriate segments (a, d) of the corresponding modular elements (1), (4). In that case, when further segments of the 7-segment modular units 31 are controlled, a display appears, which is readable in the vertical position of the measurement unit 10 shown in FIG. 4. If, however the measurement device 10 is in such an inclined or vertical position that the position-dependent switch 37 is switched over so that there appears an impulse on the clamp 44, then the gates 42 are in a pass-through state, so that the impulse at the input A1 is passed to the output d4, and the impulse at the input D4 is passed to the output A1. If this is accomplished in a corresponding manner in the other of the 7-segment modular units 31, then there results a display, which can be read in that position of the measuring unit 10, namely with reference to the display shown in FIG. 4, which can be read when FIG. 4 is placed on its head. (This had been explained by the "placing-on-the-head" of the corresponding alpha-numerical reference numerals.) From this it can be clearly seen which of the modular units 31, and which of the segments a...g within these modular units can be exchanged with one another. There consequently results a point-symmetrical arrangement, and the possibility to read the 7-segment modular unit 31, or the display unit 21 in its "normal position" and in its "placed on the head" position.

From FIGS. 1 and 3 there is also discernable the so called memory key 22, which causes, in connection with the display control 18 implemented as an electronic unit, that as a result of pressing of the memory key 22 there is written a display onto the display unit 21, which remains visible after release of the memory key 22 until the memory key 22 is operated again for an additional measurement.

I claim:

1. A device, particularly a hand-held device for measurement of radiation, particularly UV-radiation, with a sensor unit, and with a signal processing unit between the sensor unit, and a digital display unit characterized by the sensor unit (11), together with the signal processing unit (16) and the digital display unit (21) being accomodated in a common housing (26), and in that a position-dependent switch (37) together with a switchable coding circuit (19) are provided, by means of which the digital display unit (21) is switchable so that it can be read in a position reversed by 180° in a plane thereof.

2. Device according to claim 1, characterized in that in an approximately parallelepiped hand-held housing (26) there is disposed a sensor unit (11) on a front side (27) thereof, said front side having a small surface, and in that there is disposed perpendicularly thereto a digital display unit (21) on a longitudinal side (28) thereof, said longitudinal side having a large surface.

3. Device according to claim 1, characterized in that the switchable coding circuit (19) is formed by a logic matrix circuit, whose inputs are connected with a control circuit (18) for the digital display unit (21), which latter is formed as a 7-segment indicating unit, said inputs being in turn connected through a respective logic modular block (41, 42) with two mutually point-symmetrical segment indicating units (31) of the display unit (21), and that the segment indicating units (31) are controlled from the position-dependent switch (37).

4. Device according to claim 3, characterized by the control circuit (18) being connected with a key (22) for storage of the instantaneous display.

5. Device according to claim 1, wherein said sensor unit further contains a radiation filter.

* * * * *